United States Patent [19]

Steffen

[11] 3,803,509
[45] Apr. 9, 1974

[54] APPARATUS FOR OPTICAL EXCITATION OF A LASER ROD

[75] Inventor: Jürg Steffen, Kehrsatz, Switzerland

[73] Assignees: Institut fur Angewandite Physik der Universitaet Bern, Bern; Pierres Holding S.A., Biel, both of, Switzerland

[22] Filed: Apr. 26, 1972

[21] Appl. No.: 247,629

[30] Foreign Application Priority Data
Apr. 30, 1971 Switzerland.......................... 6429/71

[52] U.S. Cl................. 331/94.5, 356/195, 356/244, 356/246
[51] Int. Cl............................................. H01s 3/09
[58] Field of Search ........... 331/94.5; 356/195, 244, 356/246

[56] References Cited
UNITED STATES PATENTS
3,643,174   2/1972   Zeidler............................ 331/94.5
3,588,739   6/1971   Yoshikawa et al. ................ 331/94.5

OTHER PUBLICATIONS
Kalinin et al., Soviet J. of Optical Technology, 37 (2), Feb. 1970, pp. 129–139.

Primary Examiner—Ronald L. Wibert
Assistant Examiner—R. J. Webster
Attorney, Agent, or Firm—Eric H. Waters

[57] ABSTRACT

Apparatus for effective and uniform optical excitation of laser material for light amplifiers (lasers) comprising a laser rod which extends through one of the focal lines of an elliptically tubular mirror or of an ellipsoidal mirror, a flash-light lamp passing through the other focal line of the mirror, the lamp and rod extending parallel to one another. The lamp and the laser rod are each surrounded by a respective cooling tube, through which a cooling fluid flows, the cooling tube surrounding the laser rod being light-dispersive to provide substantially circular lines of equal intensity of optical excitation around the rod.

6 Claims, 6 Drawing Figures

PATENTED APR 9 1974 3,803,509

ROUGHENED OUTER SURFACE

APPARATUS FOR OPTICAL EXCITATION OF A LASER ROD

BACKGROUND

1. Field of the Invention

The invention relates to apparatus for optical excitation of a laser rod which extends through one of the focal lines of an elliptical mirror or a portion of an elliptical mirror, a flashlight lamp passing through the other focal line of the mirror, the lamp being parallel to the laser rod, the lamp and the laser rod each being surrounded by cooling tubes through which a cooling fluid flows.

2. Prior Art

In a conventional apparatus of this kind, there is known a tubular mirror of elliptical cross-section which defines a chamber which is limited in the axial direction by elliptical plane mirrors. The excitation lamp and the laser rod extend in the chamber along the focal axes of the tubular mirror. It is already known that adumbrations occur in the light beams reflected by the mirror, caused by the finite diameters of the lamp and the laser rod, which adumbrations results in irregular illumination of the laser rod, which results in a distortion of the laser rod, and, consequently, in irregularities of the mode of oscillation of the laser resonator in which the laser rod is provided. D. Röss in his book entitled "Laser," published by Akademische Verlagsgesellschaft Frankfurt am Main in 1966, examines this behavior in greater detail on page 445, et seq.

SUMMARY OF THE INVENTION

An object of the invention is to provide apparatus of the character described above but in which the above disadvantages and irregularities are avoided.

The invention is characterized in that the cooling tube surrounding the laser rod is light-dispersive.

As a result of the fact that the conventional cooling tube which is transparent and has a smooth surface is replaced by a light-dispersive tube, a very significant improvement of the regularity of the laser mode is achieved in a surprising manner.

DETAILED DESCRIPTION

Figure 1:
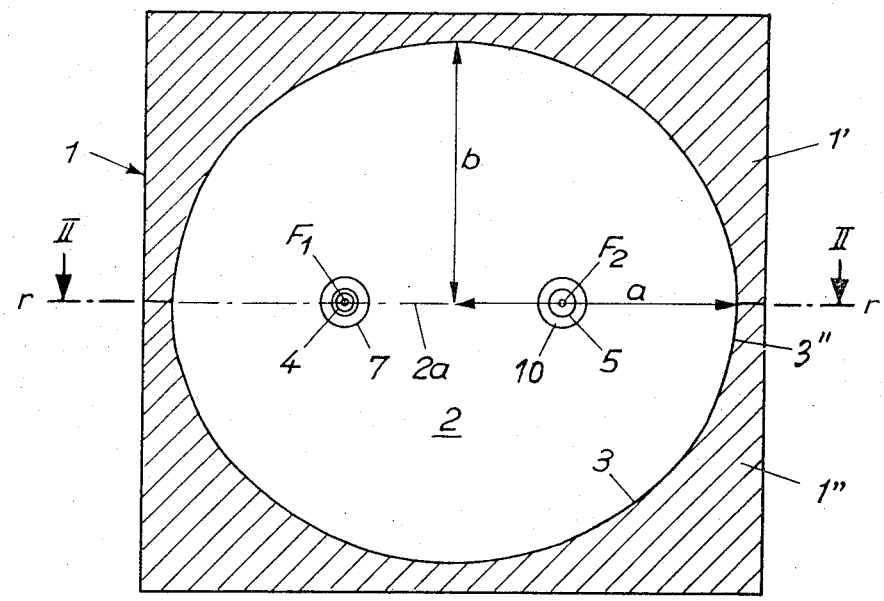
FIG. 1 is a schematic cross-section of excitation apparatus taken along line I — I in FIG. 2.
Figure 2:
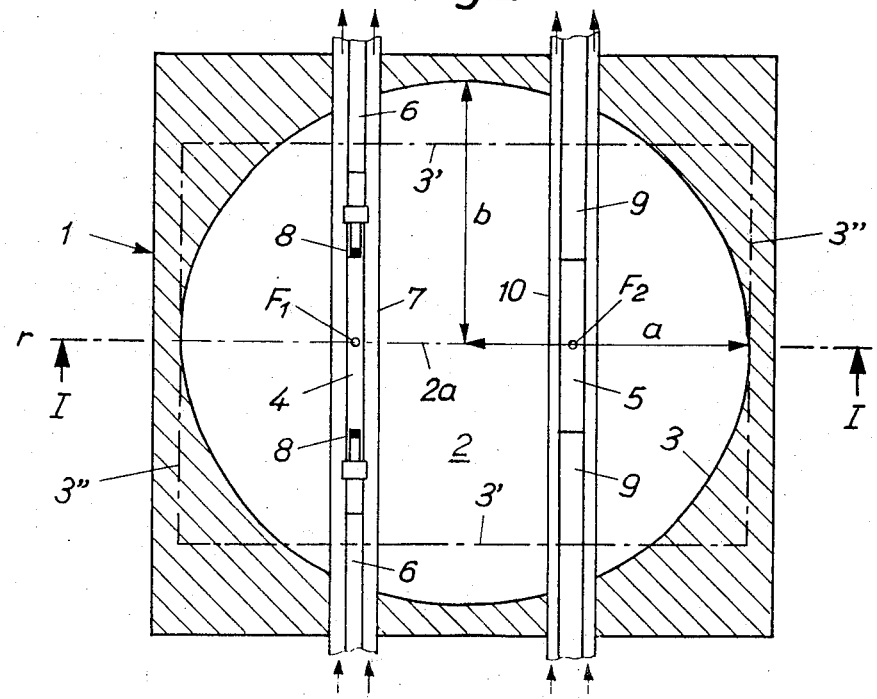
FIG. 2 is a cross-section taken along the line II — II of FIG. 1.

The excitation apparatus in FIGS. 1 and 2 comprises a housing 1 which defines a chamber 2 of ellipsoidal shape whose inner surface is mirrored and forms a rotationally elliptical concave mirror 3. The housing 1 consists in a conventional manner of two half-bowls 1' and 1''. The cross-section of chamber 2 is an ellipse whose foci are designated as $F_1$ and $F_2$. The half-axes of the ellipse have lengths $a$ and $b$, and the longer axis $2a$ of the ellipse is situated so as to coincide with the axis $r - r$ which is the axes about which the ellipse is rotated to form the ellipsoid.

A cylindrical flash-light lamp 4 and a laser rod 5 extend parallel to one another in the chamber 2 and pass through the focal points $F_1$ and $F_2$ respectively in such a manner as to be perpendicular to the axis of rotation $r - r$. The laser rod is made, for instance of yttrium-aluminum garnet (YAG). The flash-light lamp 4 is secured in the housing 1 by means of two holders 6 mounted at its ends, and the lamp is surrounded by a cooling tube 7 which is connected to a source of cooling fluid or a sink by means of corresponding channels provided in the holders 6. The holders 6 also carry electrical supply lines for the electrodes 8 of the lamp 4, the electrodes being spaced apart by a distance equal to the length of the laser rod 5. The laser rod 5 is secured in the housing 1 by means of two holders 9 and is surrounded by a cooling tube 10 which is connected to the source of cooling water or with the sink by means of corresponding channels of the holders 9.

Figure 4:
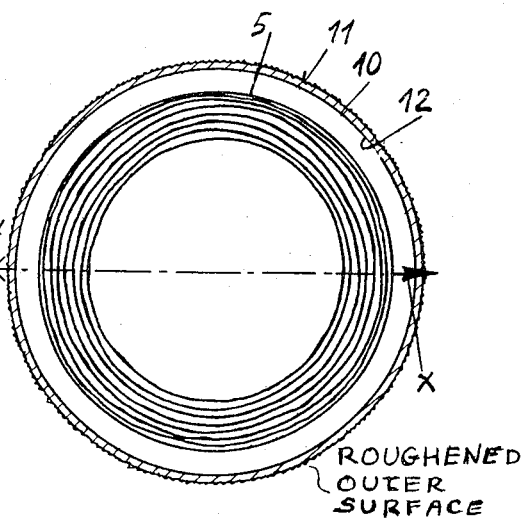
FIG. 4 shows the corresponding lines in a laser rod using a roughened cooling tube.

In contrast with the laser rod cooling tubes of conventional excitation apparatus, the cooling tube 10 is not a smooth transparent tube, through which the light beams coming directly or after reflection in mirror 3 from the flash-light lamp 4 pass in accordance with the refraction law and reach the laser rod 5, but rather the tube 10 is a significantly light-dispersing tube, wherein the light dispersion perferably results from substantial roughening of the outer surface 11 of the cooling tube 10 (see FIG. 4). However, in principle, the dispersion can also be achieved by roughening the inner surface 12 of the cooling tube 10, or by an appropriate choice of the glass body itself, e.g., opal glass. An operative range of roughness is 1 to 20 $\mu$m.

The surprising effect of this simple measure will now be explained with reference to FIGS. 3 to 6.

Figure 3:
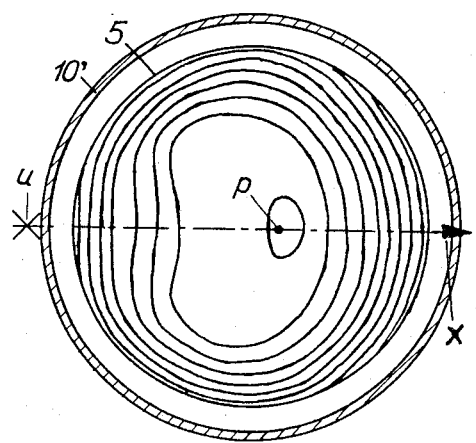
FIG. 3 is a diagrammatic illustration showing lines of equal intensity of the optical excitation in a cross-section of the laser rod with a conventional cooling tube.
Figure 5:
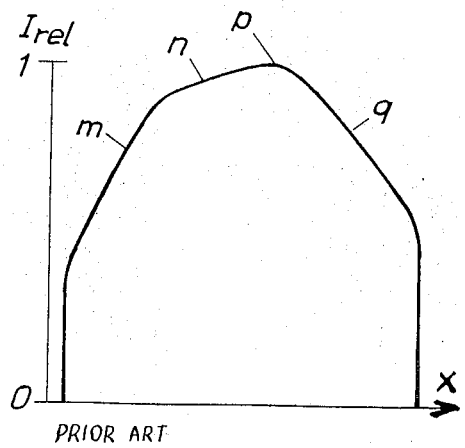
FIG. 5 is a graph showing the intensity along the X-axis of the apparatus of FIG. 3.

FIG. 3 shows lines of equal intensity of the fluorescent light excited in the laser rod 5 (lines of equal intensity) in a cross-section through the laser rod 5, in the case when a conventional, smooth, transparent tube 10' is used. In order to record the lines of equal intensity, the field is scanned dot-by-dot in succession by means of a lens and an aperture or diaphragm with an interposed fluorescent light filter and the light is transmitted to a photodiode connected to an oscillograph. During this procedure, the surface of the laser rod, with the exception of a narrow annular zone at the edge of the cross section, has been covered so as to prevent the light beams from entering the laser rod. It can be seen in FIG. 3 that the lines of equal intensity deviate significantly from a circular form. In FIG. 5, there is plotted the relative intensity $I_{rel}$ along the X-axis, wherein $I_{rel} = 1$ corresponds to the highest value thereof. A cross denoted as $u$ in FIG. 3 indicates that the flash-light lamp 4 is located to the left of the laser rod 5, but, of course, the lamp is far more distant from the rod as shown in FIGS. 1 and 2. In a like manner, the diameter of the tube 10' and 10 is significantly reduced in FIGS. 3 and 4 in relation to the diameter of the laser rod 5. It can be seen that the relative intensity, proceeding from the side where the flashlight lamp 4 is located, increases at first very rapidly in a curved portion $m$ beginning at the boundary of the cross-section, then increases more slowly in a second curved portion $n$ until it reaches its maximum $p$ located beyond the center of the cross-section and then returns almost to the starting value along a slightly convex portion $q$ ending at the opposite boundary of the laser rod. Such an illumination, whose pattern is similar in each cross-section of the laser rod, results in a non-uniform heating of the laser rod 5, which results in distortion of the laser rod. As a result of the above, the heating of the laser rod in the course of its operation not only produces the known bulging of its end surfaces (lens effect of a laser rod), but also a certain inclination of these end surfaces in relation to the axis of the laser rod. This is very detrimental to the production of regular natural oscillations in the laser resonator in which the laser rod 5 is mounted, since this inclined position varies in the course of duration of the single flash-light pulses and in the intervals between consecutive flash-light pulses.

Figure 6:
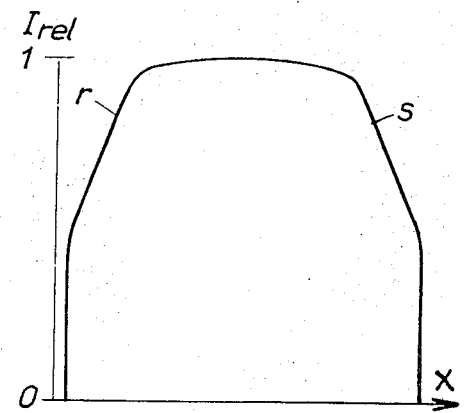
FIG. 6 is a graph showing the intensity along the X-axis of the apparatus of FIG. 4.

By use of the light-dispersing cooling tube 10, FIG. 4 (which corresponds in all other respects to FIG. 3) shows that the lines of equal intensity are substantially circular, and FIG. 6 shows that the curve of relative intensity along the X-axis is provided with two substantially symmetrical portions $r$ and $s$ at the boundaries of the laser rod. As a result of this, the above mentioned asymmetrical deformation of the laser rod and the disadvantages resulting therefrom are avoided.

Instead of providing a mirror 3 having the shape of an ellipsoid, a variant can be used including two mutually opposite elliptical plane mirrors 3' with a tubular mirror 3'' extending between mirrors 3' and having an elliptical cross-section corresponding to that of the plane mirrors 3'. These mirrors define a chamber having the shape of an elliptical cylinder, as shown in dash-dotted lines in FIG. 2. In this case, the lamp 4 and the laser rod are positioned so as to be perpendicular to the plane mirrors 3', and are fastened and cooled in a manner which is substantially the same as in the first described embodiment. It has been acknowledged that such an excitation arrangement is already known, but the known arrangement employs a smooth, transparent cooling tube 10' and not a cooling tube 10 which has substantial light-dispersing property. The first embodiment in FIGS. 1 and 2 is shown in solid lines and has the advantage as compared to the second embodiment that the light produced in the flash-light lamp and transmitted to the laser rod 5 varies to a lesser degree in the axial direction of the laser rod, i.e., the lines of equal intensity are less different from each other in various cross-sections of the laser rod 5 surrounded by a light-dispersing cooling tube 10 as compared to when the mirrors 3' and 3'' are used. This has been proved, for example, by experiment. Up to now, when a rotational ellipsoid mirror was used, the lamp and the laser rod were arranged along the axis of rotation $r - r$ and were cooled by a common cooling water circuit; however, this is not advantageous as regards freedom of vibration.

Furthermore, it is to be mentioned that, in order to avoid vibrations, in addition to utilization of the light-dispersing cooling tube, the use of flexible holders 6 for the flash-light lamp 4 is very advantageous. The holders of this kind can be provided, to advantage, with a flexible sleeve made of copper wire mesh. Holders 9, in which a rubber ring is pressed against the corresponding end of laser rod, are advantageously used for fastening the laser rod 5.

The laser rod 5 does not necessarily have to consist of a single solid body, in particular, a crystal, but it also can be formed by a tube filled by a liquid laser medium.

What is claimed is:

1. Apparatus for effective and uniform optical excitation of laser material in a laser, said apparatus comprising a reflector system including an elongated chamber with an elliptical cross-section having a mirrored surface and two focal points, said laser material comprising a laser rod extending axially in the chamber at one of the focal points, a pump source for said rod constituted as an excitation lamp extending axially in the chamber and parallel to the rod at the other of the focal points, a cooling tube surrounding the rod and a second cooling tube surrounding the lamp, the first said cooling tube around the rod being transparent and light-dispersive wherein said cooling tube surrounding the rod has inner and outer surfaces, one of which is roughened to provide the light dispersive effect.

2. Apparatus as claimed in claim 1 wherein said chamber has the shape of an ellipsoid of revolution which is formed by rotating an ellipsoid about its major axis, the elliptical cross-section of the chamber corresponding to said ellipse.

3. Apparatus as claimed in claim 2 wherein said excitation lamp and said rod extend perpendicular to the axis of rotation of the ellipse.

4. Apparatus as claimed in claim 1 comprising flexible holders for said lamp at the ends thereof.

5. Apparatus as claimed in claim 4 comprising holders including flexible support elements for said rod at the ends thereof.

6. Apparatus as claimed in claim 1 wherein the light-dispersive property of the first cooling tube is produced by a granulation of a magnitude of 1 to 20 $\mu$m to provide substantially circular lines of equal intensity of optical excitation around said rod.

* * * * *